(No Model.)
A. W. PAULL & J. F. MILLER.
GLASS MOLD FOR THE MANUFACTURE OF CHIMNEYS AND GLOBES.
No. 260,498. Patented July 4, 1882.
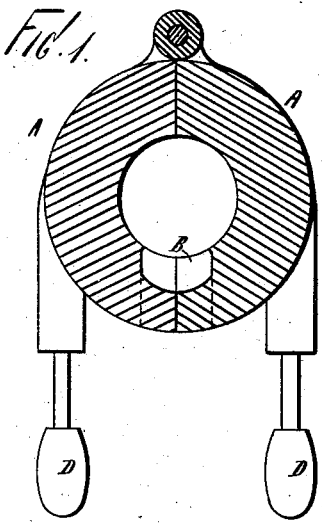
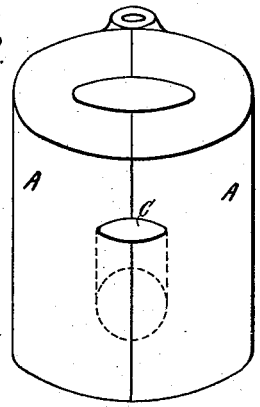
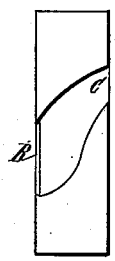
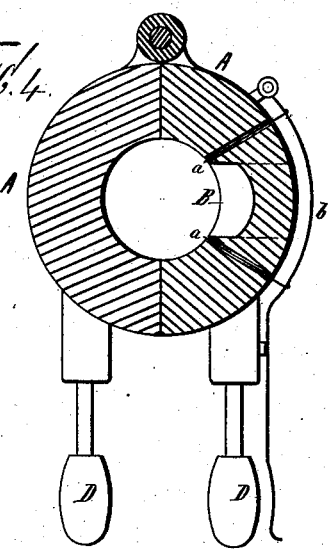
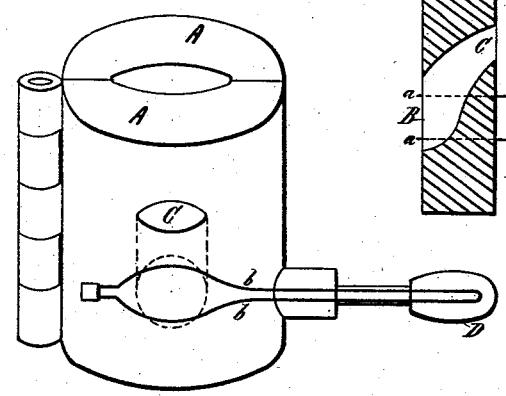
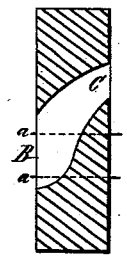
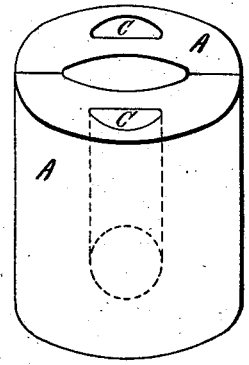
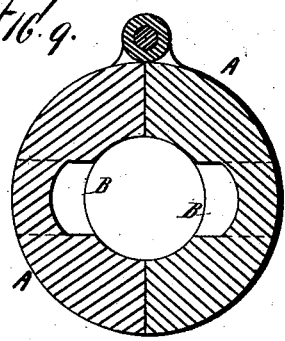

UNITED STATES PATENT OFFICE.

ARCHIBALD W. PAULL, OF WHEELING, WEST VIRGINIA, AND JOHN F. MILLER, OF MARTIN'S FERRY, OHIO.

GLASS-MOLD FOR THE MANUFACTURE OF CHIMNEYS AND GLOBES.

SPECIFICATION forming part of Letters Patent No. 260,498, dated July 4, 1882.

Application filed May 5, 1882. (No model.)

*To all whom it may concern:*

Be it known that we, ARCHIBALD W. PAULL and JOHN F. MILLER, respectively of Wheeling, county of Ohio, and State of West Virginia, and Martin's Ferry, county of Belmont, and State of Ohio, have jointly invented certain new and useful Improvements in Glass-Molds for the Manufacture of Chimneys, Globes, &c., of which the following is a full, clear, and exact description, reference being had to the accompanying drawings, and to the letters of reference marked thereon.

Our invention has relation to molds for the manufacture of globes, chimneys, shades, &c., of the character described in Letters Patent of the United States, granted to us April 11, 1882, (No. 256,158,) wherein a lens or lenses are formed upon the globe, chimney, or shade during the process of manufacture, and in such manner as to make the material of the lens and globe, chimney, or shade practically continuous.

Our present invention, being an improvement upon that shown in said patent, consists briefly in providing the mold wherein the article is formed or blown with an aperture (one or more, according to the number of lenses to be applied) through which the lens or lenses may be introduced and properly located from the exterior of the mold when the same is closed; and the invention also involves certain minor or subordinate peculiarities of construction and relative arrangements or combinations of parts, all of which will be herein first fully described, and then pointed out in the claims.

In the drawings, Figure 1 is a horizontal section of a mold constructed in accordance with our invention, and showing the lens-cavity located so as to cross the division between the parts of the mold; Fig. 2, a front view of the same, and Fig. 3 an elevation of one side or face of the joint. Fig. 4 is a horizontal section, Fig. 5 a side view, and Fig. 6 a vertical section, of one side of a mold wherein the lens-cavity and communicating aperture are made at one side of the joint between the section of the mold, and showing pins or wires for sustaining the lens. Fig. 7 is a front view of a mold wherein the aperture communicating with the lens-cavity leads down from the top of the mold. Fig. 8 is a perspective view, showing a convenient form of implement calculated for use in adjusting and holding the lens in the mold shown in Fig. 7. Fig. 9 is a horizontal section, showing two lens-cavities in the mold, and intended to indicate that any desired number may be provided.

In all these figures like letters of reference, wherever they occur, indicate corresponding parts.

As explained in our patent before mentioned, the lens, while yet in a heated condition, is introduced within the mold and the glass for the globe or chimney, &c., blown against it, so that the resulting article is formed with a lens which is continuous with the material of the article. In that patent the sections of the mold were closed about the lens and the holding implement then withdrawn from between the sections.

In the present case, A A are two sections of the mold, suitably hinged and suitably shaped upon the interior to produce the article in required form.

B is the cavity in which the heated lens is to be located, the same opening upon the interior of the mold. When this cavity crosses the joint between the movable parts of the mold, as indicated in Figs. 1, 2, and 3, it is slightly recessed, so as to catch and hold the lens in proper position.

C is an aperture leading from the exterior and communicating with the lens-cavity. The mold is closed, the lens inserted from the exterior and adjusted to its side by any suitable implement, the glass for the globe, &c., introduced and blown in the usual way, the mold opened, and the article then withdrawn.

When the cavity for the lens is not located across the joint it becomes necessary to provide means for holding the lens in place, which means will allow the completed article to be readily withdrawn from the mold.

In Figs. 4, 5, and 6 a number of pins or wires, *a a*, are introduced through the wall of the mold. These project a trifle beyond the edges of the cavity—just enough to sustain the lens in proper place. They are connected in any suitable way with a convenient form of handle, as *b b*, extended preferably in close proximity to one of the mold-handles D. When the operator closes the mold by grasping *b b* with D the pins or wires are forced inwardly enough to catch and hold the lens, which is then dropped into place and adjusted from the exterior, as before explained. When the mold is to be opened the hand is passed between *b b* and D and moves the pins *a a* away from the lens, so that the article may be withdrawn from the mold without being obstructed. Of these pins any desired number may be employed, and they may be arranged to be retracted in any other way than the one indicated. Since they come in contact with the highly-heated glass, we recommend that they be made of platinum or some metal not likely to be injuriously affected by the heat. With the pins it is not necessary to form the lens with the retreating edge, as is required to correspond with the cavity shown in Fig. 1. The points, being sharp, will at most leave only minute holes in the completed article when withdrawn, and these will in no way impair its efficiency.

The aperture communicating with the lens-cavity may have its mouth in the top of the mold, as indicated in Fig. 7, instead of in the side. Under this construction the lens may be taken up in an implement of the character shown in Fig. 8, its edge held by the lips of the implement. The lens and implement are to be inserted from the exterior of the mold, the glass then blown, the implement withdrawn, and the mold opened.

From the foregoing it will be understood that our object is to insert the lens from the exterior of the mold after the same is closed and ready to receive the glass.

The improvements enable us to adjust the lens quickly, easily, and certainly, and to effect a saving in time and expense of manufacture over methods heretofore proposed. Any number of the lens-cavities may be employed.

The improvements are also applicable in molds for blowing other articles of glassware whenever it may be desired to form projections analogous to the projecting lenses upon the class of objects named.

It has not been deemed necessary to illustrate the lens or the finished article.

Having now fully described our invention, what we claim as new, and desire to secure by Letters Patent, is—

1. In a sectional mold of the character herein described, a cavity for the reception of the separate lens or analogous article, and an aperture in the wall of the mold, arranged substantially as explained, so that the lens or analogous article may be introduced from the exterior and properly seated and held in the cavity provided for it after the mold is closed, substantially as and for the purposes set forth.

2. In combination with the mold having a cavity for the reception of a separate lens or analogous article, and an aperture leading from the exterior to said cavity, the interiorly-projecting pins or wires arranged to hold the separate article in place properly, substantially as explained.

3. In combination with the mold having a cavity for the reception of a separate lens or analogous article, and an aperture leading from the exterior to said cavity, the interiorly-projecting holding pins or wires provided with a handle or handles for retracting them, substantially as and for the purposes set forth.

4. The herein-described sectional mold for the manufacture of glassware, the same provided with a cavity for the reception of a lens or analogous article, and an aperture leading from the top and exterior of the wall of said mold for the insertion of the lens or analogous article, substantially as shown and described.

In testimony that we claim the foregoing we have hereunto set our hands in the presence of two witnesses.

A. W. PAULL.
J. F. MILLER.

Witnesses:
JOHN BUCKLER,
WORTH OSGOOD.